Figure 1:
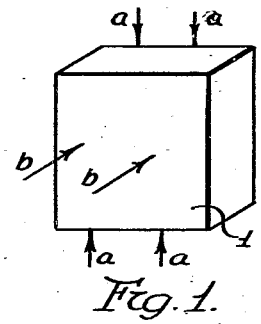

April 7, 1942.  E. H. PIRON ET AL  2,278,711

ELASTIC SPRING AND RESILIENT WHEEL

Filed Jan. 29, 1938

INVENTORS -
CLARENCE F. HIRSHFELD
EMIL H. PIRON
BY J. Windsor Davis
THEIR ATTORNEY Patented Apr. 7, 1942

2,278,711

UNITED STATES PATENT OFFICE 2,278,711

ELASTIC SPRING AND RESILIENT WHEEL

Emil H. Piron, New York, N. Y., and Clarence F. Hirshfeld, Detroit, Mich., assignors to The Transit Research Corporation, New York, N. Y., a corporation of New York Application January 29, 1938, Serial No. 187,650

4 Claims. (Cl. 295—11)

This invention relates to wheels of the type wherein a hub is supported from a rail contacting tire by means of elastic material, such as rubber, acting in shear.

The primary reason for incorporating a springing medium between the hub and tire of a rail vehicle is to absorb energy imparted to the tire within the rubber so that it is not transmitted to other parts of the wheel, to the axle and truck and to the surrounding air. Included in this category is sound energy represented by vibration of the tire member. It has been found that the noise varies with the flexibility or load deflection ratio of the springing, however, the load deflection ratio in a vertical direction is limited by other practical considerations. such as the increasing power required to drive the vehicle, and the load deflection ratio in a lateral direction is limited by the necessity of the tire running in a plane perpendicular to the hub to prevent de-railing. The ratio in a vertical direction has become rather well fixed, numerous factors having been taken into consideration, and it has been found that additional possible deflection horizontally is not only feasible but highly desirable from a noise reduction standpoint. It is therefore an object of this invention to provide an elastic springing element intended to be subjected both to shearing and compression stresses and to teach the manner of altering the load deflection ratio of the element under compression stresses with respect to the load deflection ratio under shearing stresses.

If rubber be clamped in a wheel at any temperature of its constituent parts and under a given degree of compression and the temperature of all parts then be dropped, the parts will all shrink to some extent with the shrinkage of the rubber being greatest. Thus if the rubber be rather stiff in the direction of compression and the temperature drop rather severe all compression on the rubber may be lost. However, if the rubber is sufficiently soft it is possible to maintain a compression condition thereon through the maximum possible range of shrinkage variations. Since the softness of the rubber suitable for use as a wheel springing element is definitely limited both by manufacturing considerations and since the maximum desired deflection in a vertical direction is limited by various operating factors, a further object of this invention is to teach the manner of obtaining a greater softness of springing element in the direction of clamping thereof whereby the element will be compressed through a greater distance under normal clamping assembly.

When subjected to accidental conditions, such as the dragging of the tire brake shoes or too long a period of tread braking, for instance, the rubber springing elements may be damaged by the transfer thereto of the heat generated at the tire by friction. It is therefore another object of this invention to provide springing elements together with means for the constant cooling thereof, preferably by automatic aeration.

A specific object is to provide springing elements incorporating radial passages whereby a flow of air is induced therethrough by centrifugal action during normal running operations.

Figure 2:
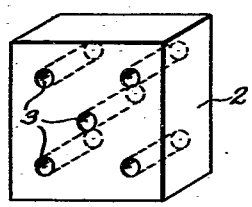
Figure 3:
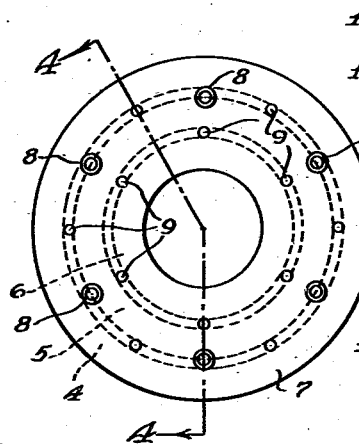
Figure 4:
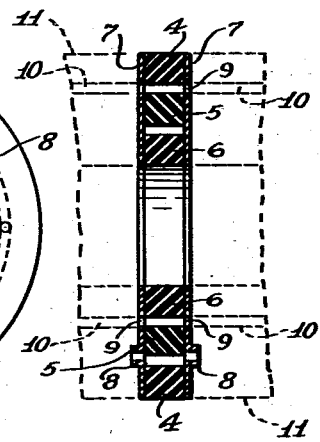
Figure 5:
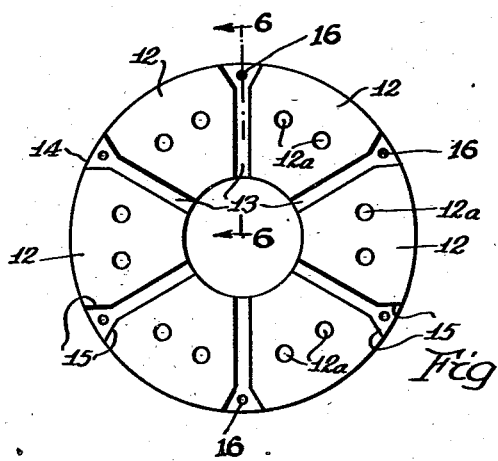
Figure 6:
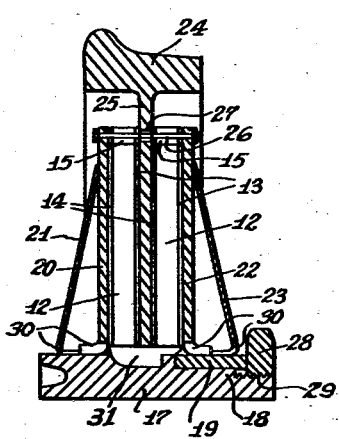
Figure 7:
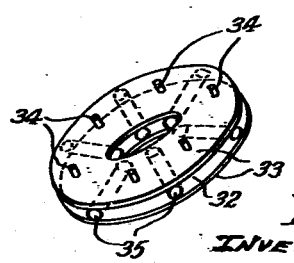

Other objects and advantages will become more apparent as reference is had to the accompanying drawing wherein:

Figures 1 and 2 are perspective views of elastic springing elements for purposes of explanation, Figure 3 is a front or back elevation of an element suitable for incorporation in a wheel, also for purposes of explanation, Figure 4 is a cross section taken on the line 4—4 of Figure 3, Figure 5 is an elevation of a springing element for a wheel with the near metallic disc removed, Figure 6 is a transverse section through half a wheel employing the element of Figure 5 with the showing of the element being along the line 6—6 thereof, and Figure 7 is a perspective of a modified form of springing element.

With reference first to Figure 1, I designates a mass of elastic material such as rubber, the term "rubber" being used hereinafter to indicate any one of the general class of elastic materials of a mobile nature of which rubber made from latex is the best known form. The mass I may be used as a shear springing element by application of a force in the direction of the arrows $a$ and as a compression spring by the application of a force in the direction of the arrows $b$. If the depth of the mass in the direction of the arrows $b$ is varied the load deflection ratio for shearing stresses will vary proportionately to the variation of the ratio for compression stresses. The spring can be given substantially the same shear value by enlarging the cross-section and at the same time removing from the section the same amount of material as has been added. Thus in Figure 2, a mass 2 has a plurality of holes 3 transversely therethrough, rubber equal to the volume of the holes 3 having been added elsewhere so that the weight of rubber is the same in Figures 1 and 2. The shear value of the two masses 1 and 2 will be substantially the same but the load deflection ratio for compression has changed, the ratio in the case of Figure 2 being substantially less. The load deflection ratio for compression forces, sometimes called the compression value or compression characteristic, is determined, among other things by the ratio between the area of the compression faces and the "free surface" or "bulge area"—that is, the area of all surfaces perpendicular thereto and unconfined.

Applying the above to an element suitable for use in a resilient wheel, the element is preferably made circular and of any one of a number of shapes, three of which are illustrated in Figures 3 to 7. In Figure 3 the spring is composed of concentric rings 4, 5 and 6 each spaced radially from the adjacent ring or rings to provide an air space, or free surface, the rings being jointly surface bonded to parallel metallic discs 7 provided with dowels 8 projecting outwardly from the exposed surfaces thereof. These dowels 8 are intended to engage dowel holes in load imposing and load receiving members. An amount of aeration may be had by providing holes 9 through the plates 7, which holes are expected to open to alined holes 10 through the load imposing and load receiving members indicated only by the dotted lines 11.

In Figure 5 the wheel element is composed of a plurality of segments 12 spaced circumferentially to provide radial air passages 13 and jointly surface-bonded at opposite faces to opposed parallel discs 14, or individually bonded to parallel metallic segments, the disc or metallic segments toward the reader being removed in Figure 5. The rubber segments are each trimmed at the ends of their outer circumferential portions 15 thus permitting the air spaces 13 to diverge in shape at their outer ends. Alined holes 16 pierce both plates 14 at each diverging end of the air passages.

The Figure 6 is similar to that illustrated in Figure 5 but illustrating the metallic segments which are co-extensive with the adjacent face of the rubber to which each is attached. Each segment has two dowels 12a projecting outwardly therefrom. These segments are assembled in a wheel in which a hub 17 has a reduced portion 18 onto which a collar 19 is slidable. A main radial plate 20 braced by a conical plate 21 is welded to the hub 17 and a second main radial plate 22 braced by a conical plate 23 is welded to the collar 19. A tread member or tire 24 is integral with an inwardly radiating plate 25 which resides between the main plates 20 and 22 and which is separated from each of the main plates by a springing element 12, 13, 14. In the event that the element of Fig. 5 is used the holes 16 are employed to accept the bolts 26 which extend therethrough and through holes 27 of substantially larger diameter through the plate 25, these bolts being optional as an additional means to prevent diverging of the plates 20 and 22 when pressure is applied on the rubber elements when the nut 28 on the hub 17 is screwed onto its threads 29. In order to permit a flow of air through the passages 13 the plates 20, 21, 22 and 23 are provided with holes 30 to inlet air to the space 31 between the elements and the hub 17.

In Figure 7 the spring element is composed of a disc or short cylinder of rubber 32 surface bonded at each side to metallic discs 33 each of which has a plurality of dowels 34 projecting from the surface thereof. The rubber 32 has a plurality of cylindrical openings 35 extending radially therethrough, the diameter of each cylinder being equal to or less than the distance between the plates 33. This element is readily made by inserting removable core pieces in the rubber during curing and molding and while the rubber is being cured to the discs 33. The element is then used in a wheel such as is illustrated in Figure 6 wherein air inlets are provided to supply air to the cylinders 35.

What we claim is:

1. A springing element of ring shape comprising a plurality of sector-shaped segments of rubber surface bonded at opposite faces to metallic face plates common to all of said segments, said segments being spaced circumferentially thereby providing a plurality of air spaces radially of the element.

2. A springing element of ring shape comprising a plurality of sector-shaped segments of rubber surface bonded at opposite faces to metallic face plates common to all of said segments, said segments being spaced circumferentially thereby providing a plurality of air spaces radially of the element, said segments being cut away at each end of their outer peripheral portions whereby said air spaces are of diverging shape at their outer ends, said plates having bolt receiving apertures adjacent the diverging passage portions.

3. A rail wheel comprising a hub having two relatively movable plates radiating therefrom, a third plate between said parallel plates, springing elements separating said third plate from each of said parallel plates, said springing elements each comprising two circular metallic discs surface bonded to a plurality of segments of rubber therebetween, said segments of rubber being spaced apart to provide air chambers, and means drawing said parallel plates toward each other whereby said elements are maintained under substantial compression, each of said circular metallic discs having dowels arising from the exposed surfaces thereof for engagement with openings in said plates whereby said discs and said segments are maintained against sliding with respect to said plates.

4. A rail wheel comprising a hub having wheel plates radiating outwardly therefrom, a tire having a tire plate radiating inwardly therefrom and residing between said wheel plates, springing elements separating said tire plate from each of said wheel plates each comprising a plurality of circumferentially spaced elements forming air passages therebetween and surface-bonded to common parallel metallic discs, said segments each being cut back near its outer periphery whereby each air passage formed between said segments diverges at its outer end, said discs having aligned openings therethrough in the diverging portions of said air passages, and bolts extending through said aligned openings and through additional openings aligned therewith through all of said plates for maintaining the wheel in pressure assembly, said discs having dowels arising from the exposed surfaces thereof for engagement with openings in said wheels for retaining said springing elements against sliding movement with respect to said plates, said wheel plates having openings near the hub to admit a flow of air through said air passages.

EMIL H. PIRON.
CLARENCE F. HIRSHFELD.